United States Patent
Langley

(10) Patent No.: US 9,109,400 B2
(45) Date of Patent: Aug. 18, 2015

(54) METHOD AND APPARATUS FOR USE OF MICROBES AND OTHER GAS STIMULANTS IN RADIAL ENHANCEMENT DRILLING FLUID

(71) Applicant: Mike Langley, Euless, TX (US)

(72) Inventor: Mike Langley, Euless, TX (US)

(73) Assignee: Mike Langley, Euless, TX (US)

( * ) Notice: Subject to any disclaimer, the term of this patent is extended or adjusted under 35 U.S.C. 154(b) by 101 days.

(21) Appl. No.: 13/573,722

(22) Filed: Oct. 4, 2012

(65) Prior Publication Data
US 2014/0097025 A1 Apr. 10, 2014

Related U.S. Application Data

(60) Provisional application No. 61/543,212, filed on Oct. 4, 2011.

(51) Int. Cl.
   E21B 7/18 (2006.01)
   E21B 7/04 (2006.01)
   E21B 43/00 (2006.01)
   C09K 8/035 (2006.01)

(52) U.S. Cl.
   CPC . *E21B 7/04* (2013.01); *C09K 8/035* (2013.01); *E21B 7/18* (2013.01); *E21B 43/006* (2013.01)

(58) Field of Classification Search
   CPC .......................................... E21B 7/18
   USPC ....................................... 175/65, 67
   See application file for complete search history.

(56) References Cited

U.S. PATENT DOCUMENTS

| 3,081,828 | A | * | 3/1963 | Quick | 175/67 |
| 5,955,401 | A | * | 9/1999 | Liao | 507/110 |
| 5,955,701 | A | * | 9/1999 | Schockner et al. | 174/66 |
| 2012/0247763 | A1 | * | 10/2012 | Rakitsky et al. | 166/279 |

FOREIGN PATENT DOCUMENTS

WO  WO 2013/095934  * 6/2013

* cited by examiner

*Primary Examiner* — William P Neuder

(57) ABSTRACT

Microbes, nutrients or other gas stimulants are employed in the drilling fluid that is used to cut radial jet laterals or laterals of any shape or size into subsurface coal formations and other hydrocarbon formations. By employing solutions used for microbial methane farming and the like directly in radial jet enhancement drilling, microbes, nutrients or other stimulants are injected deeper into subsurface coal formations and over a much larger surface area, greatly enhancing the ability to "farm gas" from mature or depleted wells.

18 Claims, 3 Drawing Sheets

METHOD AND APPARATUS FOR USE OF MICROBES AND OTHER GAS STIMULANTS IN RADIAL ENHANCEMENT DRILLING FLUID

CROSS-REFERENCE TO RELATED APPLICATION AND CLAIM OF PRIORITY

This application claims the benefit of U.S. Provisional Patent Application No. 61/543,212 filed on Oct. 4, 2011 and entitled METHOD AND APPARATUS FOR USE OF MICROBES AND OTHER GAS STIMULANTS IN RADIAL ENHANCEMENT DRILLING FLUID.

TECHNICAL FIELD

The present disclosure is directed, in general, to gas production from subsurface hydrocarbon containing formations, and more specifically, to use of microbes, nutrients and other gas stimulants in radial enhancement drilling fluid to stimulate such gas production.

BACKGROUND

Subsurface carbonaceous (e.g., coal) formations are geological formations below ground level that contain coal. Such formations are found throughout the world and are located at varying depths. Examples of subsurface coal formations are coal fields, coal reservoirs, coal basins, coal beds, coal seams, coal horizons, and coal mines.

Production of coal-bed methane (CBM) or other gas from subsurface coal formations involves injection of bioconversion microbes, nutrients for such microbes and/or chemical stimulants into the formations. However, the efficacy of existing injection techniques can be improved.

There is, therefore, a need in the art for improved injection of microbial, nutrient and/or chemical solutions into subsurface carbonaceous formations.

SUMMARY

Microbes, nutrients or other gas stimulants are employed in the drilling fluid that is used to cut radial jet laterals into subsurface coal formations and other hydrocarbon formations. By employing solutions used for microbial methane farming and the like directly in radial jet enhancement drilling, microbes, nutrients or other stimulants are injected deeper into subsurface coal formations and over a much larger surface area, greatly enhancing the ability to "farm gas" from mature or depleted wells.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
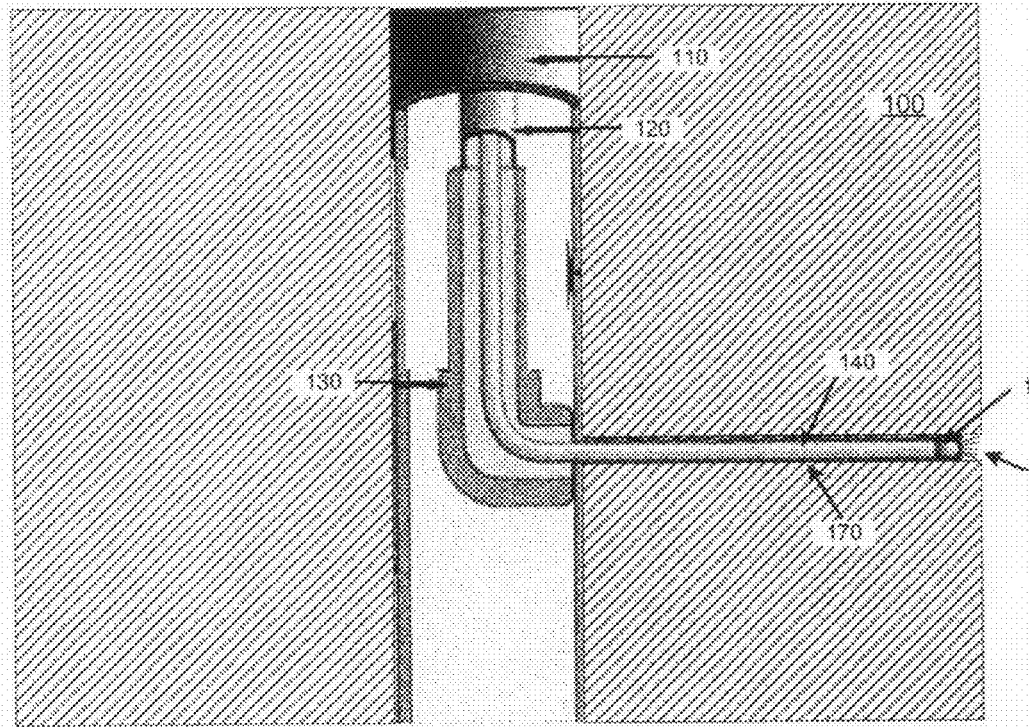
FIG. 1 illustrates an apparatus for using a microbe/nutrient/stimulant mixture as a drilling fluid in radial jet enhancement, according to an embodiment of this disclosure.
Figure 2:
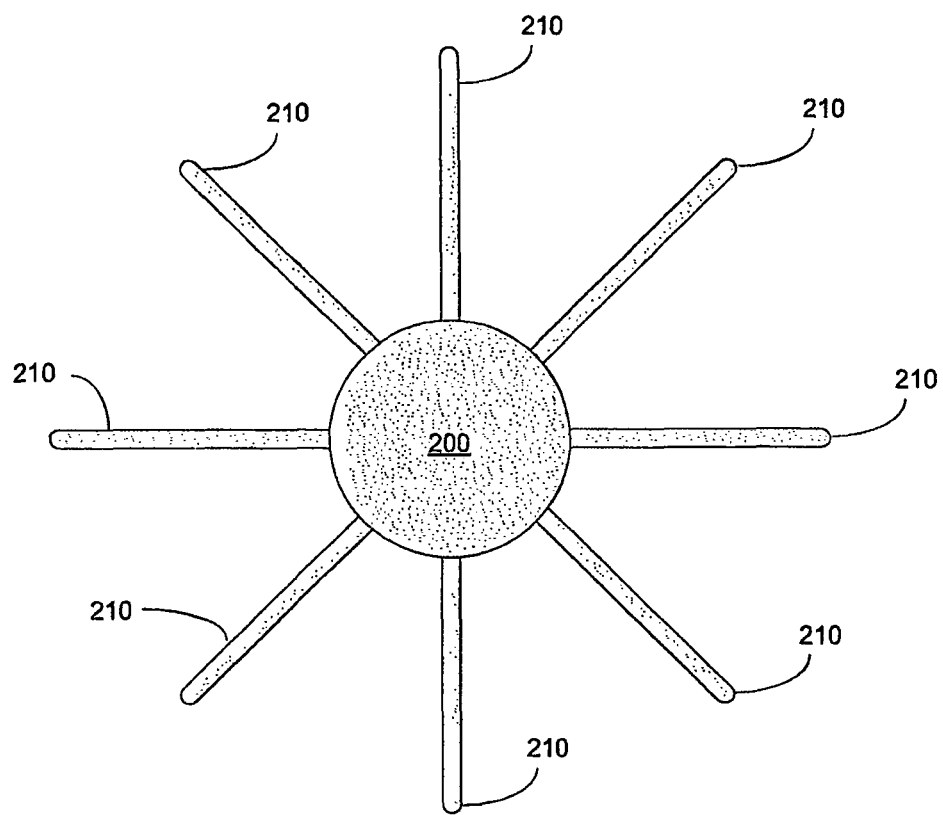
FIGS. 2 and 3 illustrate a top view and perspective view, respectively, of a plurality of lateral cuts extending radially from a well bore, according to one embodiment of this disclosure.
Figure 3:
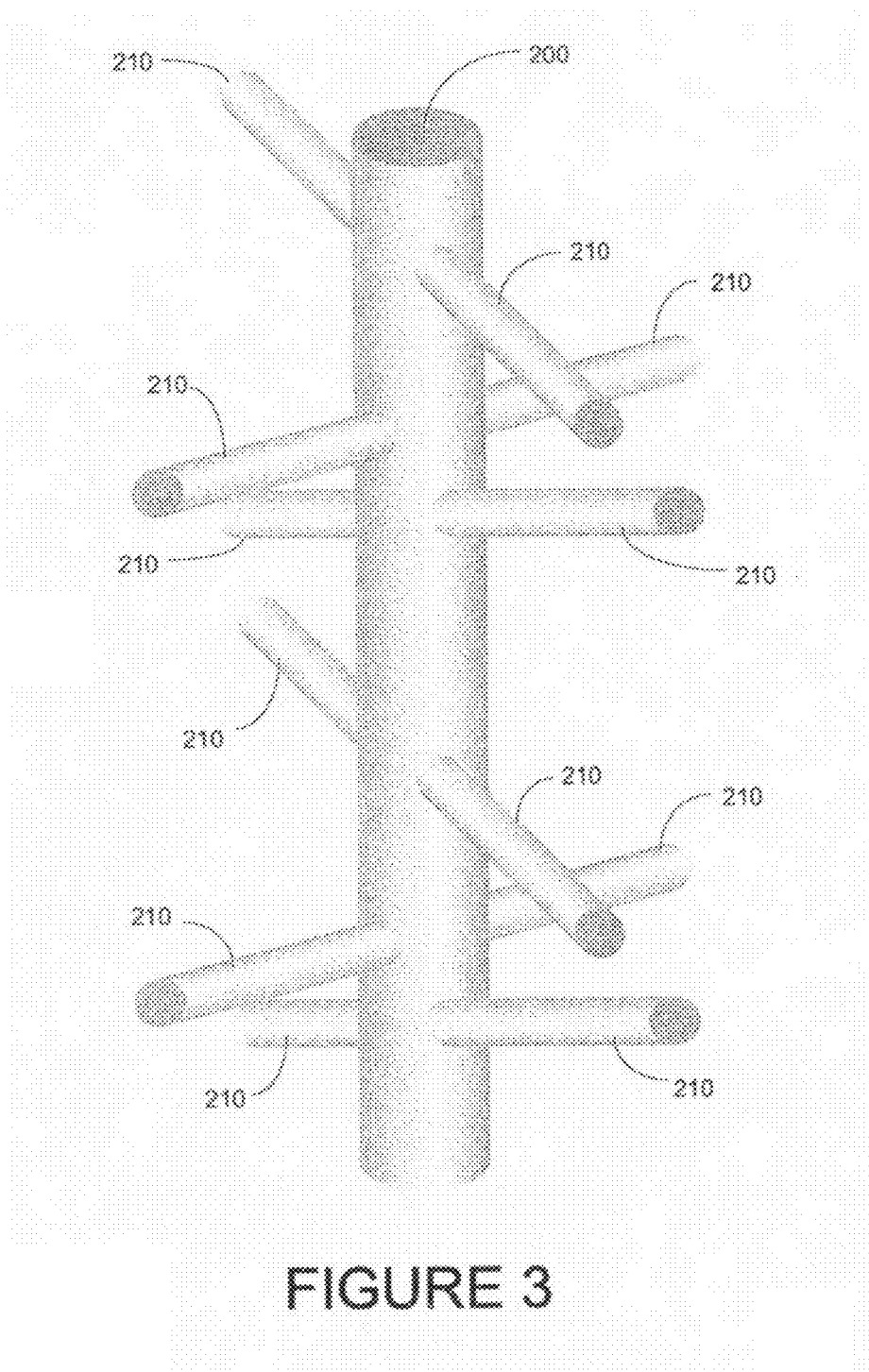

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged gas production operation.

The following description provides specific details for a thorough understanding of, and enabling description for, various embodiments of the subject matter contemplated by the present disclosure. However, those skilled in the art will understand that the subject matter of the present disclosure may be practiced without all details disclosed. In other instances, well known structures and functions have not been shown or described in detail for simplicity and clarity.

As used herein, "microbes" and "microbial" may refer to any microscopic organism or compound such as bacteria, fungi, amino acids, and the like. The term "radial jet lateral" is also known as "radial cut", "lateral cut", "lateral hole", or simply "lateral". These terms may be used interchangeably in this disclosure.

The present disclosure relates to using microbes, nutrients or other gas stimulants in drilling fluid that is used to cut radial jet laterals into subsurface coal formations and other hydrocarbon formations. By employing microbes, nutrients or stimulants used for microbial methane farming directly in radial jet enhancement drilling, such microbes, nutrients or other stimulants are injected deeper into subsurface coal formations and over a much larger surface area, greatly enhancing the ability to "farm gas" from mature or depleted wells. That is, embodiments of this disclosure are able to produce commercially viable levels of coal bed methane. Other features of the disclosed embodiments include production cost savings and more rapid time to production.

Research has determined that some natural gas deposits were created in processes outside of geothermal activity. For example, microorganisms that metabolize oil, shale, and coal into methane formed a significant portion of existing gas reserves. Accordingly, the natural gas industry has been actively studying methods to hasten this natural process. Using a technique known as microbial methane farming, gas producers introduce coal-eating microbes into subsurface coal formations, or stimulate microbes that are already present in the coal formations, in order to produce methane gas from the coal. This Biological process can be used to resume or accelerate gas production in mature or otherwise depleted gas and oil fields and coal-bed methane (CBM) wells, thereby allowing economical extraction of gas.

One method for introducing microbes, nutrients for such microbes or other stimulants into the coal formations is to first create radial cuts or bores in the coal formations, then inject microbes, nutrients or stimulants into such cuts once created. One technique for creating cuts in coal formations is a technique known as radial jet enhancement, which involves creating multiple cuts that extend radially away from the generally vertical well bore into the coal formation.

In radial jet enhancement, one or more holes are cut in the well bore casing. A high pressure drilling fluid is then released from a jet nozzle through each hole, thereby drilling or cutting a lateral passage into the hydrocarbon formation (oil sand, coal, etc.) outside the well bore. As the cut is made, the jet nozzle can be advanced into the formation to lengthen the cut. Once one cut has been made, the jet nozzle can be moved to a different hole to make cuts at other angles and other depths.

Once a suitable number of lateral cuts have been generated in the coal formation, the work tubing is retooled for injection of microbes/nutrients/stimulants into the newly formed cuts. This may involve removal and reconfiguration of the work tubing, the deflecting shoe, and addition or replacement of other components in the well bore. Finally, a liquid mixture containing microbes/nutrients/stimulants is injected into the new radial cuts in the subsurface coal formation. The microbes react with the coal and convert the coal into methane gas.

Generally speaking, the more coal surface area to which the injected microbes, nutrients or stimulants can be exposed, the more methane that can be farmed. This is because the microbes react with the coal molecules on the exposed surfaces of the coal in order to generate methane (or existing microbes within the formation are encouraged to produce by nutrients or otherwise stimulated by contact with injected chemicals). Thus, longer holes cut into the coal formations are beneficial due to the larger exposed surface area inside the hole. Moreover, longer holes are more likely to intercept other naturally occurring breaks, cracks, and fissures in the coal into which the microbes, nutrients and/or stimulants can penetrate.

However, conventional methods of introducing the microbe/nutrient/stimulant mixture into the lateral cuts may not provide sufficient pressure to advance the microbes/nutrients/stimulant into the far reaches of each cut, crack, fissure, etc. Thus, to maximize the coal surface area exposed to the microbe/nutrient/stimulant mixture, operators must pressurize (or "pressure up") the well to high pressures in order to force the microbe mixture deeper into the lateral cuts. Even under high pressure, however, injection of microbes/nutrients/stimulant into the ends of each cut and into the farthest reaches of other naturally occurring cracks connected to the drilled laterals is nearly impossible.

Thus, using a multi-step approach of first cutting lateral holes and then introducing the microbe or stimulant mixture, a well operator is not able to maximize the surface area of the coal that is exposed to the methane farming process, resulting in less gas being extracted for a given cycle of drilling and injection. Furthermore, the operator incurs additional costs, both temporal and financial, in performing the multiple steps.

In accordance with this disclosure, a well operator solves these problems by using the microbe/nutrient/stimulant mixture as all or part of the drilling fluid. Thus, while cutting the lateral cuts (and leaving behind residue from the drilling fluid), the operator also injects the microbe/nutrient/stimulant mixture into the farthest points of each lateral cut. The pressure of the drilling fluid also causes the microbe/nutrient/stimulant mixture to penetrate into the cracks in the coal exposed or formed by the lateral cut. By combining the two processes and using the microbes in the drilling fluid, an operator actually cuts the laterals with the microbe/nutrient/stimulant mixture and exposes the surfaces of such cuts and any intersecting cracks or fissures to the microbes/stimulant. Thus, the operator does not need to separately pressure up or push the microbe/nutrient/stimulant mixture into the cut laterals. The operator is also able to extend the total surface area of coal that is exposed to the microbe mixture. Conventional processes do not use the mixture as all or part of the cutting agent. This adds ineffective additional steps to the methane farming process.

FIG. 1 illustrates an apparatus for using a microbe/nutrient/stimulant mixture as a drilling fluid in radial jet enhancement according to one embodiment of this disclosure. The apparatus shown in FIG. 1 is for illustration only. It will be understood that other embodiments may be used without departing from the scope of this disclosure.

As shown in FIG. 1, a well bore extends through all or part of a subsurface coal formation 100. The well bore is lined with a well bore casing 110. Inside the well bore casing 110 is a work tubing 120, onto which a deflecting shoe 130 is attached. In one aspect of operation, work tubing 120 and deflecting shoe 130 are inserted into well bore casing 110. A casing cutter (not shown) is then inserted through work tubing 120 and is operated to cut one or more holes in well bore casing 110. Once the holes in well bore casing 110 have been cut, the casing cutter is removed.

Next, a container or reservoir (not shown) containing a microbial/nutrient/stimulant mixture is plumbed to a jet tube 140 and nozzle 150. The microbial/nutrient/stimulant mixture serves as the drilling fluid or cutting agent. Alternatively, the microbial/nutrient/stimulant mixture may be mixed with another drilling fluid or cutting agent. Jet tube 140 and nozzle 150 are then inserted through work tubing 120, deflecting shoe 130, the hole in casing 110, and into subsurface coal formation 100. Drilling fluid 160 containing the microbial/nutrient/stimulant, mixture is released at high pressure from jet nozzle 150 and drills or cuts a lateral hole 170 in coal formation 100. As the cut is made, jet nozzle 150 is advanced into coal formation 100 to continue the cut. The microbes in drilling fluid 160 contact the coal and penetrate into the surrounding pores, cracks, and fissures in coal formation 100. The microbes react with the coal and convert the coal into methane. By using the microbial/nutrient/stimulant mixture in drilling fluid 160 at high pressure, the surface area of the coal contacted by the microbial/nutrient/stimulant mixture is increased. This results in greater methane production.

Once one lateral cut has been formed, jet tube 140 and nozzle 150 are retracted to deflecting shoe 130. Deflecting shoe 130 may then be rotated and lowered or raised in the well bore casing to make cuts at other angles and other depths. The length of each lateral cut and the number of cuts from each well bore can be varied based on the properties of the formation, the desired gas production, financial considerations, and any other factors. The pressure and velocity of drilling fluid 160 may be varied according to the desired length of lateral hole 170, the properties of formation 100, and so forth.

FIGS. 2 and 3 illustrate a top view and perspective view, respectively, of a plurality of lateral cuts 210 extending radially from a well bore 200, according to one embodiment of this disclosure. For ease of explanation, the lateral cuts 210 are described as being formed with the apparatus of FIG. 1. The lateral cuts 210, however, may be formed using any other suitable system. The number; depth, angle, and length of each lateral cut are shown for illustration purposes only. It will be understood that lateral cuts in other configurations are within the scope of this disclosure. In one embodiment, twenty (20) laterals are cut at different levels and radial angles in one well bore. Each lateral cut is approximately five hundred feet (500') long.

In another embodiment, microbe nutrients or other gas stimulants in addition to, or instead of, a microbe mixture are added to, or used as, the drilling fluid. Like the microbe mixture, the microbe nutrients or other gas stimulants are introduced into the coal formation during lateral drilling to stimulate gas production. For example, one stimulant operates to "break down" the coal, to allow the microbes to react more easily with the coal. In some embodiments, the formula for the drilling fluid may change and the design of the lateral cuts may be optimized. In some embodiments, the microbe-based drilling method may be used in formations other than coal, such as oil sands, shale, and the like.

A problem that is often encountered in the coal bed methane industry is the collapse of the lateral cuts. In some formations, the coal seams become too permeable and collapse into the lateral cuts. In one embodiment of this disclosure, this 11 collapse 11 event may be reduced or overcome by jetting smaller laterals into the coal seam. Instead of casing size (diameter of 10" or greater) mechanical laterals, smaller vein-like laterals (diameter of 2⅜" to 2⅞") are formed. A hardener chemical is added to the drilling fluid that strengthens the lateral, allowing the lateral to maintain its vein-like structure for longer periods of time.

In accordance with the embodiments described above, this disclosure features improved methods for injecting a methane-producing microbe mixture or other stimulant deeper into subsurface coal formations or other formations. An operator would use these methods to jet spray the mixture deeper into the coal vein, thereby increasing the surface area for the microbes to farm. The high pressures in the operation force the microbes into deeper recesses and over a larger surface area than was previously possible. The disclosed methods combine the two processes of jetting laterals and injecting a mixture directly into the well into one cost-effective process that generates superior results. Thus, the disclosed methods allow an operator to "farm" natural gas in a highly repeatable process.

Collapsing mechanical laterals are currently a problem in microbial methane farming, resulting from coal seams that become too permeable and collapse. Jetting small, vein-like (2⅜" to 2⅞" diameter), laterals to a distance of 300 to 500 feet into the coal seam with radial jet enhancement drilling instead of drilling casing size (10" or greater) mechanical laterals, and/or using a hardener chemical that will strengthen the lateral allowing it to maintain its vein-like structure, will allow the lateral cut to avoid collapse for a longer period.

Twenty or more of these 500' laterals may be cut from one well bore at differing levels. While cutting, instead of using water to jet the veins, a blend formula of microbial bacteria that breaks down the coal into methane is employed. By affecting more coal surface area, greater production possibilities are achieved. By using the mixture as the cutting agent, more surface area is contacted, increasing production as much as exponentially.

In should be noted that actually forming the radial cuts using a drilling fluid free of microbes, nutrients or stimulants, but then injecting the microbe/nutrient/stimulant mixture as the jet tube is retracted is among the techniques contemplated in the present disclosure for injecting microbes/nutrients/stimulants "while forming" the radial cuts.

Although the figures above illustrate specific systems, structures, and methods, various changes may be made to the figures. For example, various components in the systems and structures can be combined, omitted, further subdivided, or moved according to particular needs. In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for radial enhancement drilling, comprising:
   preparing a microbial mixture;
   plumbing the microbial mixture to a radial enhancement drilling machine;
   operating the radial enhancement drilling machine to form radial cuts in a hydrocarbon formation using the microbial mixture as a drilling fluid, wherein the microbial mixture is employed as at least one of a drilling fluid and a cutting agent forming the radial cuts; and
   employing a second drilling fluid and cutting agent in addition to the microbial mixture to form the radial cuts.

2. The method of claim 1, wherein a hardener chemical is added to a drilling fluid comprising the microbial mixture to strengthen a lateral formed by the radial cuts.

3. The method of claim 1, wherein the microbial mixture is injected into the hydrocarbon formation under a pressure sufficient to cut a lateral into the hydrocarbon formation.

4. The method of claim 1, wherein the hydrocarbon formation is nominally depleted.

5. The method of claim 1, further comprising:
   extracting coal bed natural gas (CBNG) from the hydrocarbon formation.

6. A method for radial enhancement drilling, comprising:
   preparing a microbial mixture;
   plumbing the microbial mixture to a radial enhancement drilling machine;
   operating the radial enhancement drilling machine to form radial cuts in a hydrocarbon formation using the microbial mixture as a drilling fluid; and
   injecting nutrients for microbes within the microbial mixture into the hydrocarbon formation.

7. The method of claim 6, wherein the nutrients are injected into the hydrocarbon formation together with the microbial mixture.

8. The method of claim 6, wherein the hydrocarbon formation is nominally depleted.

9. The method of claim 6, further comprising:
   extracting coal bed natural gas (CBNG) from the hydrocarbon formation.

10. The method of claim 6, wherein a hardener chemical is added to a drilling fluid comprising the microbial mixture to strengthen a lateral formed by the radial cuts.

11. The method of claim 6, wherein the microbial mixture is injected into the hydrocarbon formation under a pressure sufficient to cut a lateral into the hydrocarbon formation.

12. An apparatus, comprising:
    a reservoir containing a prepared microbial mixture;
    a radial enhancement drilling machine; and
    a plumbing connection between the reservoir and the radial enhancement drilling machine, wherein the radial enhancement drilling machine is configured to farm radial cuts in a hydrocarbon formation using the microbial mixture as a drilling fluid, wherein the microbial mixture is employed as at least one of a drilling fluid and a cutting agent forming the radial cuts, and wherein the radial enhancement drilling machine employs a second drilling fluid and cutting agent in addition to the microbial mixture to form the radial cuts.

13. The apparatus of claim 12, wherein a hardener chemical is added to a drilling fluid comprising the microbial mixture to strengthen a lateral formed by the radial cuts.

14. The apparatus of claim 12, wherein the microbial mixture is injected into the hydrocarbon formation under a pressure sufficient to cut a lateral into the hydrocarbon formation.

15. The apparatus of claim 12, wherein the radial enhancement drilling machine injects nutrients for microbes within the microbial mixture into the hydrocarbon formation.

16. The apparatus of claim 15, wherein the nutrients are injected into the hydrocarbon formation together with the microbial mixture.

17. The apparatus of claim 12, wherein the hydrocarbon formation is nominally depleted.

18. The apparatus of claim 12, further comprising:
gas production equipment configured to extract coal bed natural gas (CBNG) from the hydrocarbon formation.

\* \* \* \* \*